Dec. 21, 1954  G. H. WALKER  2,697,643
MAGNETIC CLEANER FOR MACHINE WAYS
Filed April 12, 1954
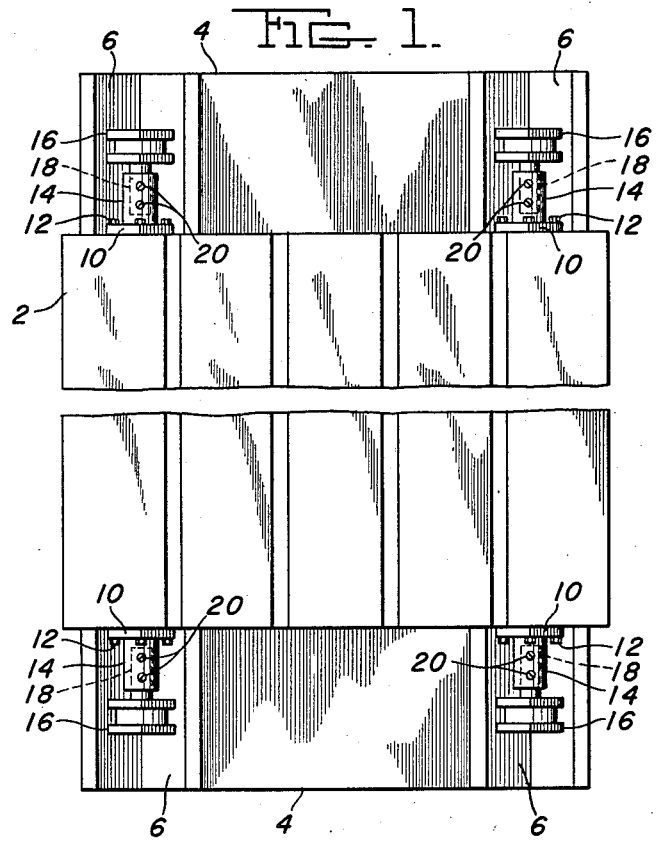
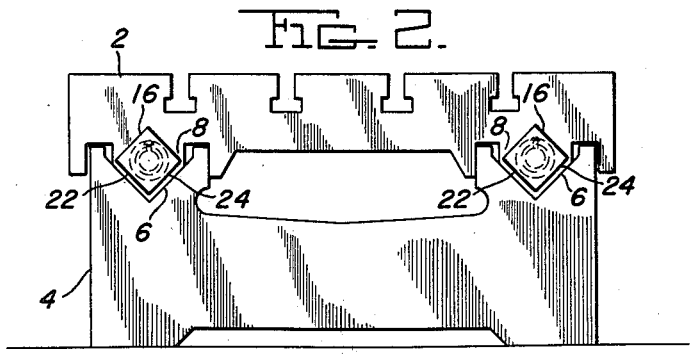
INVENTOR:
GEORGE H. WALKER,
BY: Donald G. Dalton
his Attorney.

United States Patent Office 2,697,643
Patented Dec. 21, 1954

2,697,643

MAGNETIC CLEANER FOR MACHINE WAYS

George H. Walker, Johnstown, Pa., assignor to United States Steel Corporation, a corporation of New Jersey Application April 12, 1954, Serial No. 422,544

2 Claims. (Cl. 308—3.5)

The present invention relates generally to the machine tool art and more particularly to a magnetic cleaner for maintaining the ways of a machine tool free of abrasive iron or steel particles.

Prior to my invention, maintaining the sliding V ways of a machine planer bed free of iron and steel cuttings or chips constituted a serious problem in the machine industry.

In the operation of a machine planer some of the cuttings or fine particles generated at the cutting tool fall in the ways of the planer bed. The abrasive action of the metal particles and their tendency to imbed themselves in the smooth finished surface of the planer bed ways under pressure of the reciprocating planer table made it necessary, prior to my invention, to frequently plane off and then rebuild the worn surfaces. In an effort to remedy this detrimental condition, felt wipers were attached to the ends of the table to ride on the ways and sweep off the cuttings before they could cause damage. This arrangement, however, did not prove entirely satisfactory since the cuttings penetrated the felt or accumulated under the wipers so that the abrasive action was actually multiplied in some cases.

It is, accordingly, an object of my invention to provide an auxiliary cleaning means which is attached to a planer table for picking up and holding any iron or steel particles which may lodge on the ways of the planer bed before the reciprocating planer table reaches them.

This and other objects will become more apparent after referring to the following specification and attached drawings, in which:

Figure 1 is a top plan view; and
Figure 2 is an end view.

Referring more particularly to the drawings, reference numeral 2 designates a planer table mounted for reciprocal movement on a planer bed 4. The planer bed is provided with a pair of spaced V-shape grooves or ways 6 extending longitudinally along its upper surface for receiving a pair of V-shaped guide ribs 8 which depend from the undersurface of the planer table. Suitable power means (not shown) are provided for moving the planer table along the planer bed. The surfaces of the ways 6 are highly polished to permit smooth travel of the guide ribs 8 therealong.

The above-described elements are conventional and are not claimed as my invention, the details of which will now be described.

Reference numeral 10 indicates a base plate fastened by bolts 12 or similar means to each end of the planer table above the ends of the guide ribs 8. An elongated socket 14 is welded or otherwise affixed to each of the plates 10 and projects axially away from the end of the planer table with its open end outwardly disposed. A permanent magnet 16, such as an Alnico permanent magnet or other similar commercially available type, is provided, by welding or otherwise, with a stud fitting 18 and is fitted by means of the stud in each of the sockets 14. Positive retention of the studs 18 within the sockets 14 is accomplished by means of set screws 20.

Each of the magnets 16 is rectangular in contour and is positioned within the socket 14 in such a manner so that the angle between two of its sides 22 and 24 coincides with the apex of the way into which it projects. Each of the magnets is dimensioned so that it fits symmetrically into a way with a space between the magnet sides 22 and 24 and the faces of the way, as best shown in Figure 2. The rigid manner in which the magnets are mounted on the ends of the table serves to maintain the proper spacing between the sides of the magnet and the surfaces of the ways.

In operation, as the planer table moves back and forth over the ways of the planer bed, all iron and steel cuttings, chips, etc. are attracted to and held by the magnets 16. Depending on the type of work being performed on the planer, it may be sufficient to provide magnets at only one end of the planer table, however, for most heavy operations, I have found it preferable to have magnets affixed to both ends of the table.

Since the magnets extend beyond the ways when the planer table is at the limit of its movement in either direction, removal of the accumulated particles is easily accomplished by manually wiping off each of the magnets with a cloth.

In addition to maintaining the ways free of abrasive particles, the device of my invention also functions to remove the microscopic metal particles from the lubricating oil which is constantly recirculated over the ways when the machine is in operation.

While one embodiment of my invention has been shown and described, it will be apparent that other adaptations and modifications may be made without departing from the scope of the following claims.

I claim:

1. In a machine tool including a work-supporting table mounted for reciprocal movement on a bed, and a guide rib depending from the undersurface of said table and extending substantially along its length, said bed having a longitudinal groove in the surface thereof for receiving said guide rib, the improvement therewith of a magnet affixed to the leading end of said table and extending into said groove, said magnet having a portion shaped to fit into said groove spaced slightly from the walls thereof.

2. In a machine tool the improvement as defined by claim 1 characterized by a second magnet being affixed to the following end of said table and extending into said groove, said magnet having a portion shaped to fit into said groove spaced slightly from the walls thereof.

No references cited.